UNITED STATES PATENT OFFICE.

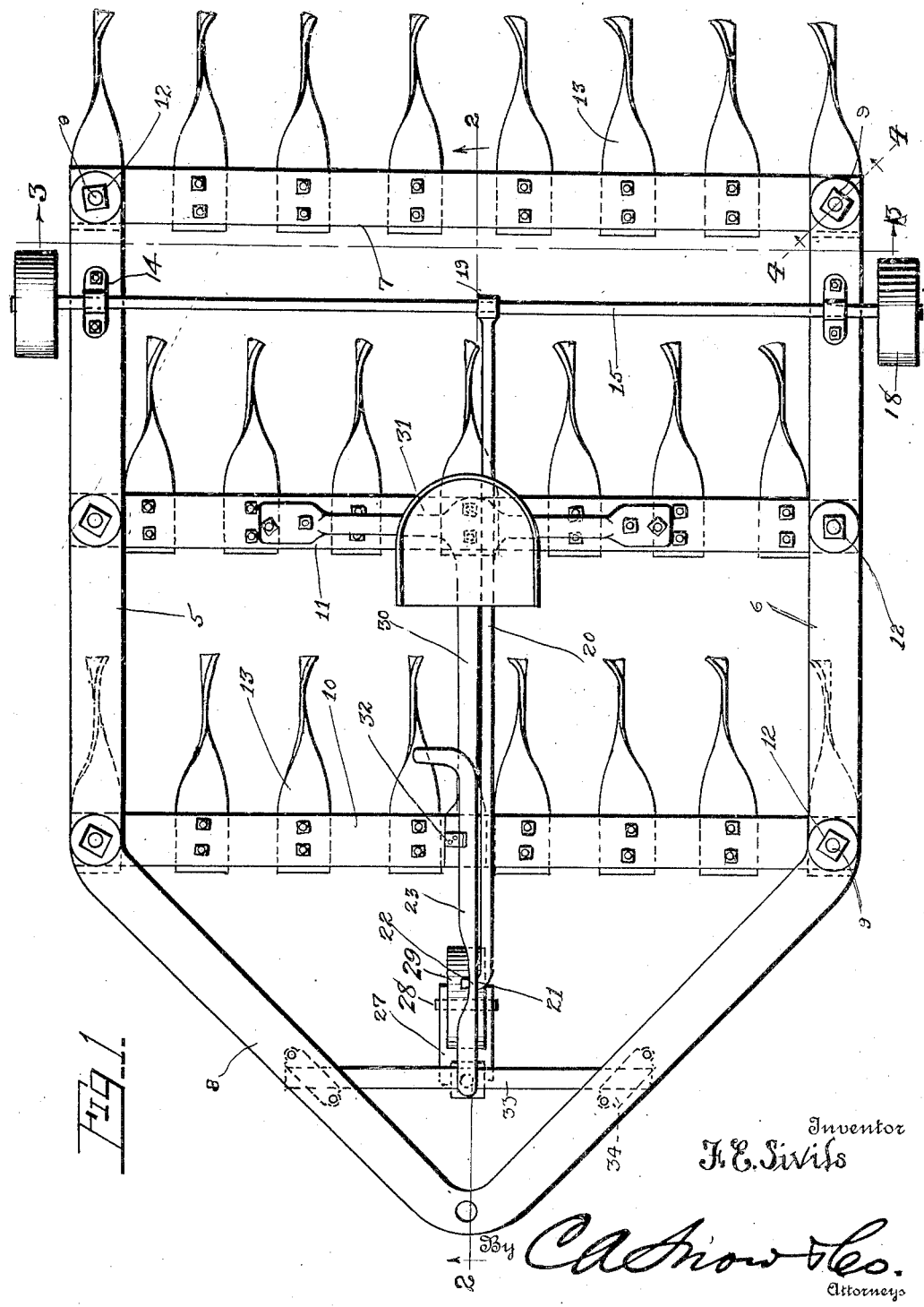

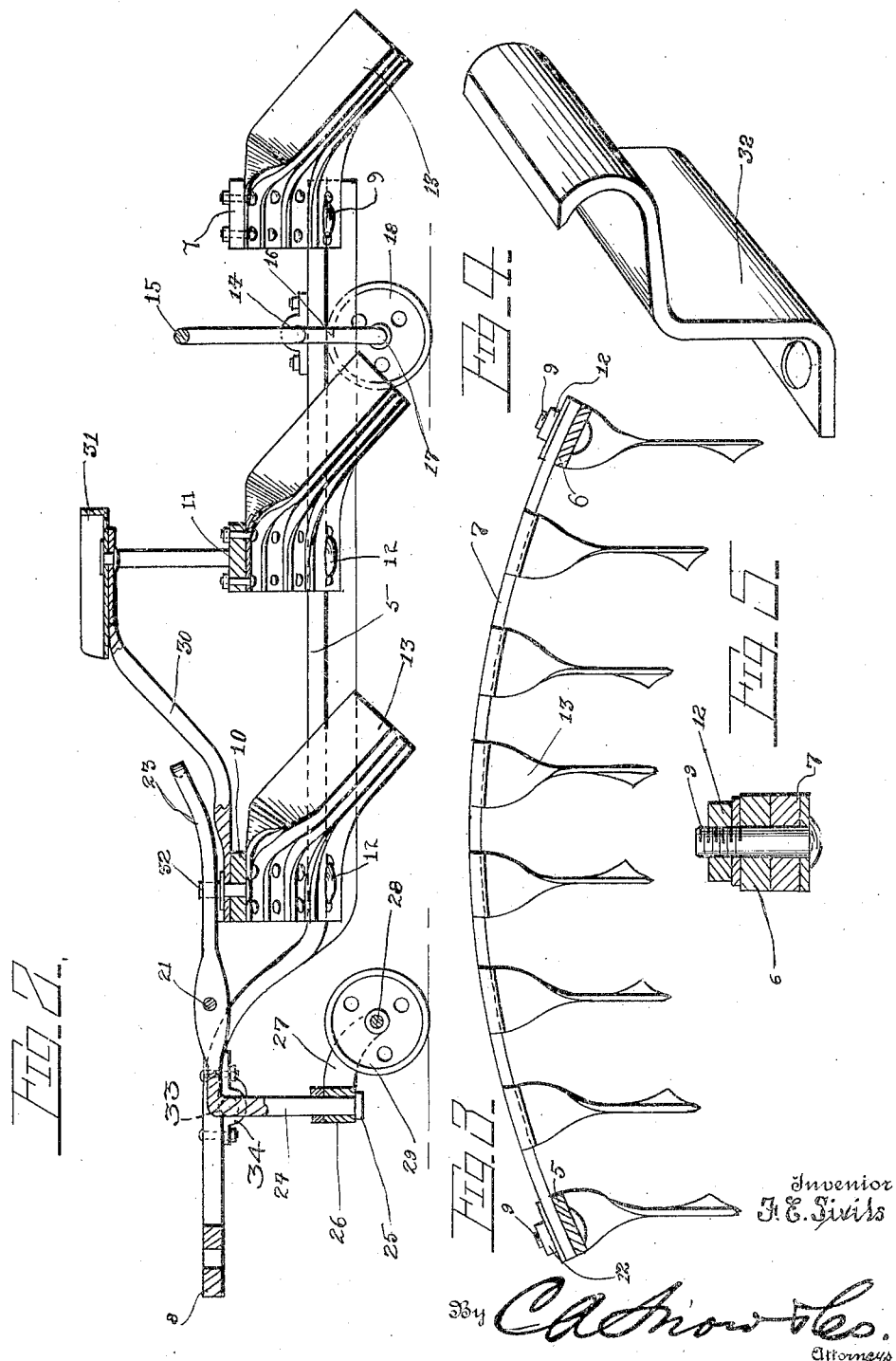

FLOYD E. SIVILS, OF LAWRENCE, MISSISSIPPI.

HARROW.

1,345,966.     Specification of Letters Patent.     Patented July 6, 1920.

Application filed August 29, 1919. Serial No. 320,640.

*To all whom it may concern:*

Be it known that I, FLOYD E. SIVILS, a citizen of the United States, residing at Lawrence, in the county of Newton and State of Mississippi, have invented a new and useful Harrow, of which the following is a specification.

This invention has reference to agricultural machinery, and more particularly to harrows.

The primary object of the invention is to provide a harrow which will, during the harrowing operation, cut the clods of the soil, undergoing treatment, pulverizing the same, to better render the soil fit for planting.

A further object of the invention is to provide a harrow having cutting teeth disposed in such relation with each other, that the harrow will contact with substantially the entire surface over which the same is moving.

A further object of the invention is to provide a harrow having blades constructed to turn the earth and weeds, of the plowed field, under, as well as in, toward the center of the frame.

A still further object of the invention is to provide means for moving the harrow teeth into and out of operative relation with the ground surface, the means being located adjacent the operator's seat.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a top plan view of a harrow constructed in accordance with the present invention.

Fig. 2 illustrates a sectional view taken on line 2—2 of Fig. 1.

Fig. 3 illustrates a sectional view taken on line 3—3 of Fig. 1.

Fig. 4 illustrates a detailed view of the securing device, employed for securing the operating lever, and Fig. 5 illustrates a sectional view taken on line 4—4 of Fig. 1.

Referring to the drawings in detail, the harrow constructed in accordance with the present invention includes the side bars 5 and 6, end bar 7, and front bar 8, the front bar as shown being in the form of a triangle, and apertured adjacent the forward portion thereof, to receive the suitable draft rigging, not shown.

The rear bar 7, has its ends connected to the side bars 5 and 6, by means of the bolts 9, passing through registering openings formed in the bars 5, 6, and 7, said bar 7, being curved, as indicated by Fig. 5 of the drawings, whereby the harrow teeth adjacent the ends thereof, and to be hereinafter more fully described, lie in a plane in close proximity to the ground, while the central harrow teeth, lie in a plane spaced from the ground surface over which the harrow is operating.

The transversely extending teeth supporting bars 10 and 11, are also connected to the side bars 5 and 6, at the respective ends thereof, by means of the bolts 12, which bolts also pass through suitable openings in the bars. Disposed in spaced relation throughout the length of each of the harrow teeth supporting bars, are the teeth 13, which as shown extend rearwardly, and have portions thereof turned inwardly toward the center of the machine, to provide a shear, the curved portions of the teeth on one side of the machine, extending toward the curved portions of the teeth 13 of the opposite side of the machine, whereupon the teeth have a tendency to not only turn the soil, and weeds over, but at the same time throw the same inwardly toward the center, thereby leveling the field during the harrowing operation.

As shown, the teeth of one bar, are disposed in a plane to the rear of, and between the teeth of the adjacent bar, thereby insuring the contacting of the teeth with the entire ground surface, over which the harrow is operating, the teeth of the rear bars, contacting with the soil turned over and inwardly, by the teeth of the adjacent forward bar.

Supported on the frame, adjacent the rear thereof, and by means of the brackets 14, is the supporting axle 15, having portions thereof embraced by the brackets 14, the said axle also having depending portions 16, terminating in right angled shafts 17, which shafts support the wheels 18, disposed at opposite sides of the frame.

The central portion of the shaft 15, is embraced by the collar 19, formed on one end of the relatively long horizontally disposed operating rod 20, the forward end thereof extending at right angles to the body portion, as at 21, and being embraced by the walls of the aperture 22, formed in the operating lever 23, the rear end of said operating lever extending at right angles to the body portion thereof, to provide a handle.

The forward end of the operating lever 23, extends at right angles to the body portion thereof, as at 24, and is provided with the head 25, adjacent the extreme end thereof, which head engages the collar 26, of the supporting arms 27, to prevent displacement thereof, and allow free rotary movement with relation thereto.

As shown, the supporting arms 27 are connected by the shaft 28, which shaft forms a bearing for the wheel 29. A substantially T-shaped supporting member 30, has connection with the transversely disposed teeth supporting bars 10 and 11, and supports the seat 31, to be occupied by the operator.

From the foregoing it will be seen that when the harrow is in the position as indicated by Fig. 2, the teeth thereof, are out of contact with the ground surface, to permit the harrow to be moved to its proper position on the field to be harrowed. Upon properly locating the harrow on the field, the operating lever 23, is released from the cleat 32, which is bolted to the front bar 10 of the frame, whereupon the right angled end 24 of the operating lever rocks upwardly, with the result that a relative movement is imparted to the depending portions 16 of the supporting axle 15. It follows that the harrow teeth 13 are embedded within the plowed surface of the field.

It might be further stated that the operating lever 23, is rigidly connected to the transversely extending bar 33, which has its ends operating in the bearings 34, secured to the under surface of the forward portion of the frame to permit a free rotary movement of said bar 33, when the operating lever 23, is moved to allow the harrow teeth to contact with the ground surface. The bar 33, of course supports the wheel 29.

Having thus described the invention, what is claimed is:—

In a harrow, a frame comprising side bars, teeth supporting bars having the ends thereof connected to the side bars, the teeth supporting bars being curved transversely of their lengths, a plurality of teeth supported on the teeth supporting bars, each of said teeth having a lower cutting edge and having a curved portion, the teeth of one bar being disposed in a plane between the teeth of the adjacent bar, and means for moving the teeth into and out of operation.

In testimony that I claim the foregoing as my own, I have hereto affixed my signature in the presence of two witnesses.

FLOYD E. SIVILS.

Witnesses:
W. L. PACE,
W. W. HELLEN.